United States Patent
Lube et al.

(10) Patent No.: US 7,478,831 B2
(45) Date of Patent: Jan. 20, 2009

(54) AIRBAG MODULE FOR A MOTOR VEHICLE

(75) Inventors: Thomas Lube, Berlin (DE); Andreas Pradel, Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/000,196

(22) Filed: Dec. 10, 2007

(65) Prior Publication Data

US 2008/0150267 A1 Jun. 26, 2008

Related U.S. Application Data

(63) Continuation of application No. PCT/DE2006/001006, filed on Jun. 7, 2006.

(30) Foreign Application Priority Data

| Jun. 10, 2005 | (DE) | ............... 10 2005 027 910 |
| Dec. 15, 2005 | (DE) | ............... 20 2005 020 680 U |
| Dec. 15, 2005 | (DE) | ............... 20 2005 020 687 U |
| Mar. 16, 2006 | (DE) | ............... 10 2006 013 359 |

(51) Int. Cl.
*B60R 21/276* (2006.01)
*B60R 21/239* (2006.01)

(52) U.S. Cl. ............... 280/739; 280/736; 280/742

(58) Field of Classification Search ............... 280/736, 280/739, 742; *B60R 21/28*
See application file for complete search history.

(56) References Cited

U.S. PATENT DOCUMENTS

| 5,743,558 | A * | 4/1998 | Seymour ............... 280/739 |
| 5,799,974 | A | 9/1998 | Honda |
| 6,017,056 | A | 1/2000 | Lee |
| 6,039,346 | A | 3/2000 | Ryan et al. |
| 6,158,770 | A | 12/2000 | Ryan et al. |
| 6,161,866 | A | 12/2000 | Ryan et al. |
| 6,290,257 | B1 | 9/2001 | Bunce et al. |
| 6,406,055 | B1 | 6/2002 | Faigle et al. |
| 6,692,022 | B2 * | 2/2004 | Schenck et al. ............ 280/739 |
| 6,736,425 | B2 | 5/2004 | Lemon et al. |
| 7,055,857 | B2 | 6/2006 | Marotzke |
| 7,401,809 | B2 * | 7/2008 | Lube ............... 280/739 |
| 2001/0045734 | A1 | 11/2001 | Damman et al. |
| 2003/0025309 | A1 | 2/2003 | Schenck et al. |

(Continued)

FOREIGN PATENT DOCUMENTS

DE 40 16 046 A1 11/1991

(Continued)

*Primary Examiner*—Ruth Ilan
(74) *Attorney, Agent, or Firm*—Foley & Lardner LLP

(57) ABSTRACT

An airbag module for a motor vehicle includes an airbag, an inflow orifice, a continuously running marginal region, a gas generator, a generator carrier having a base and emerging from an output orifice, a surface defined by the marginal region, and a continuous running wall protruding from the base. The wall has at least one first outflow orifice through which gas emerging from the gas outlet orifice of the gas generator can pass into the outside space of the airbag module. A cylindrical ring with a clearance is arranged displaceably on the wall in a movement direction running around the wall. The clearance is able to be brought into congruence with the outflow orifice as a result of a displacement of the cylindrical ring in the movement direction to open the first outflow orifice.

43 Claims, 14 Drawing Sheets

U.S. PATENT DOCUMENTS

2004/0113406 A1 * 6/2004 Elqadah et al. ............. 280/739

FOREIGN PATENT DOCUMENTS

| DE | 197 54 280 A1 | 7/1998 |
| DE | 198 09 573 A1 | 9/1999 |
| DE | 198 10 537 A1 | 9/1999 |
| DE | 199 35 016 A1 | 2/2000 |
| DE | 102 05 699 A1 | 10/2002 |
| DE | 101 24 273 A1 | 11/2002 |
| DE | 101 39 626 A1 | 3/2003 |
| EP | 0 974 497 A1 | 1/2000 |
| EP | 1 279 574 A1 | 1/2003 |
| EP | 0 952 937 B1 | 11/2005 |
| WO | WO 98/31570 | 7/1998 |
| WO | WO 02/08025 A1 | 1/2002 |
| WO | WO 03/104046 A1 | 12/2003 |
| WO | WO 2004/094201 A1 | 11/2004 |

* cited by examiner

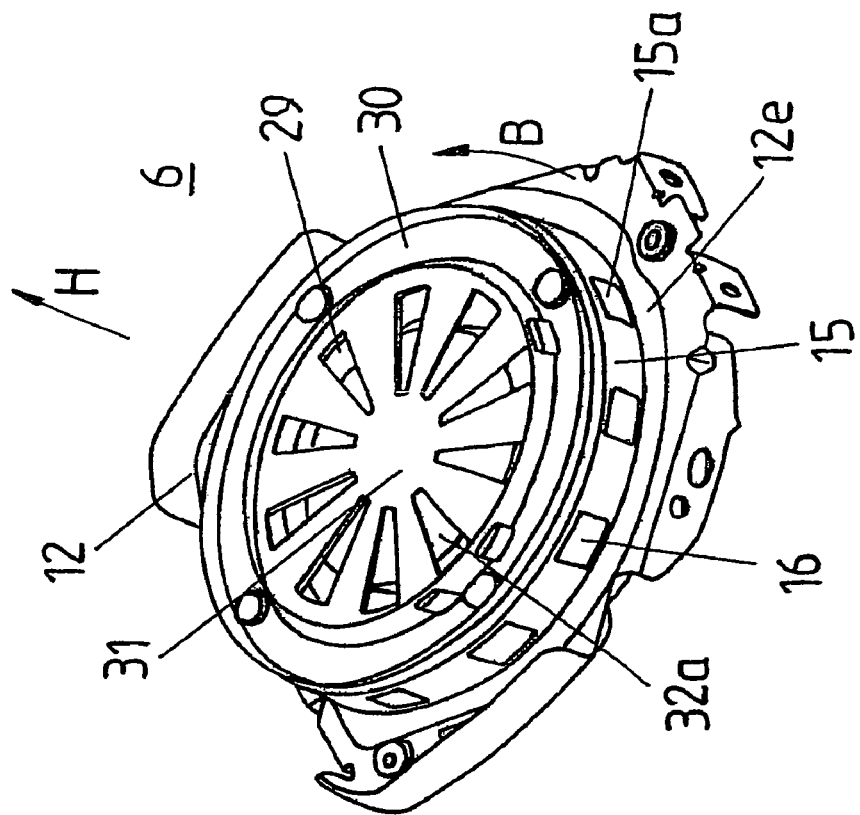
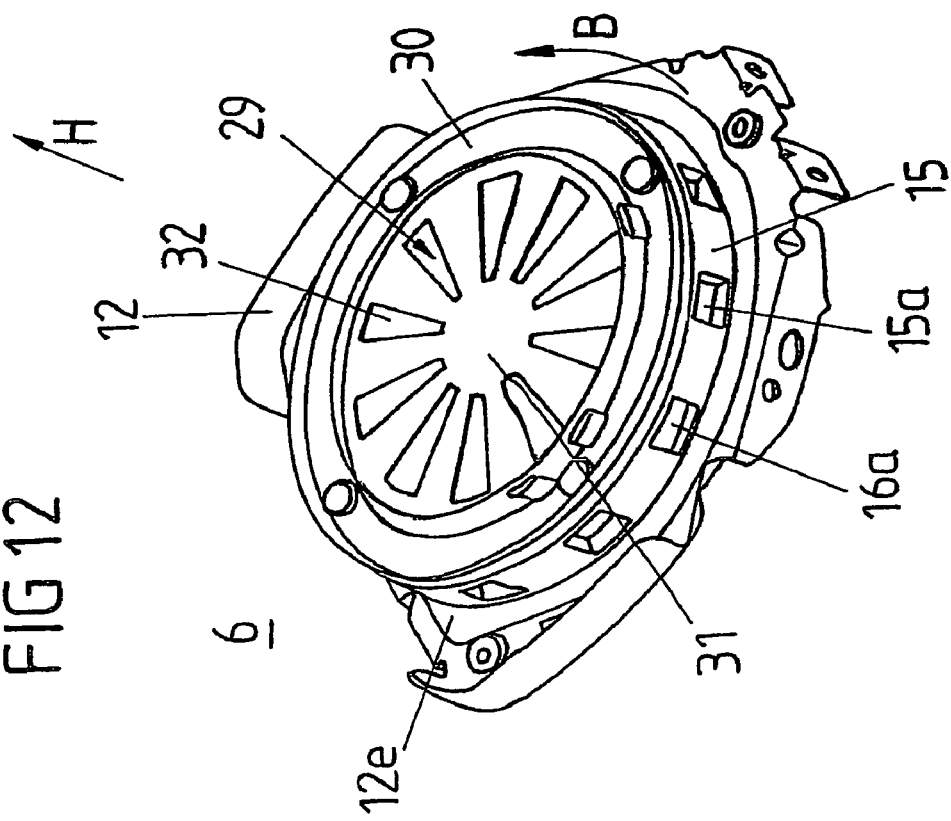

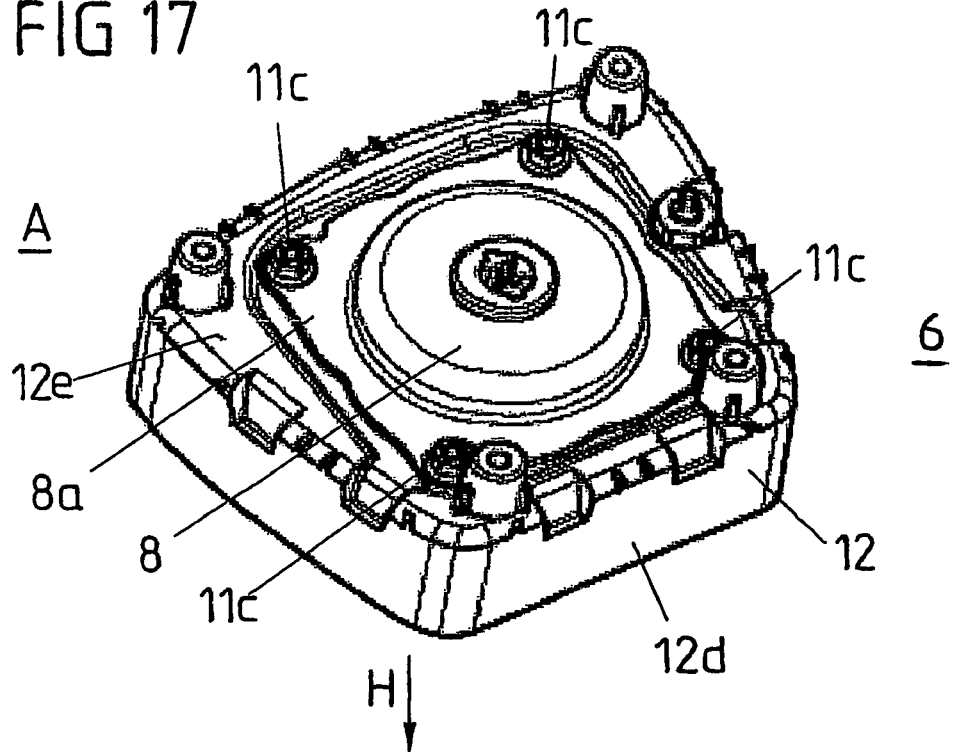
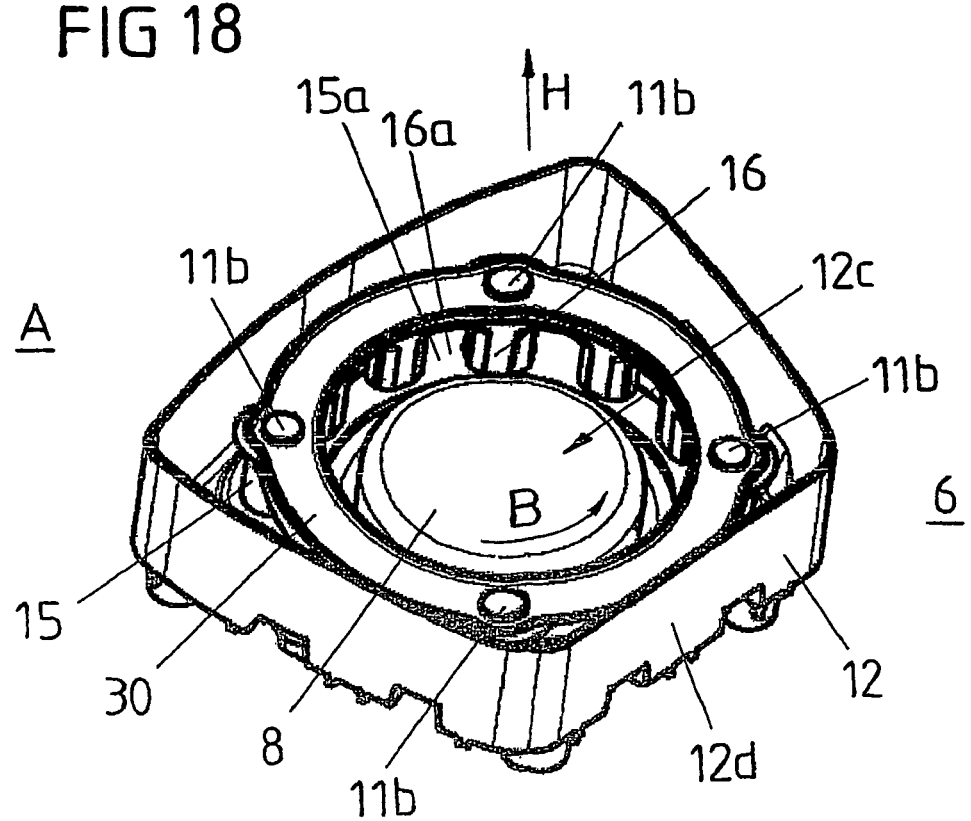

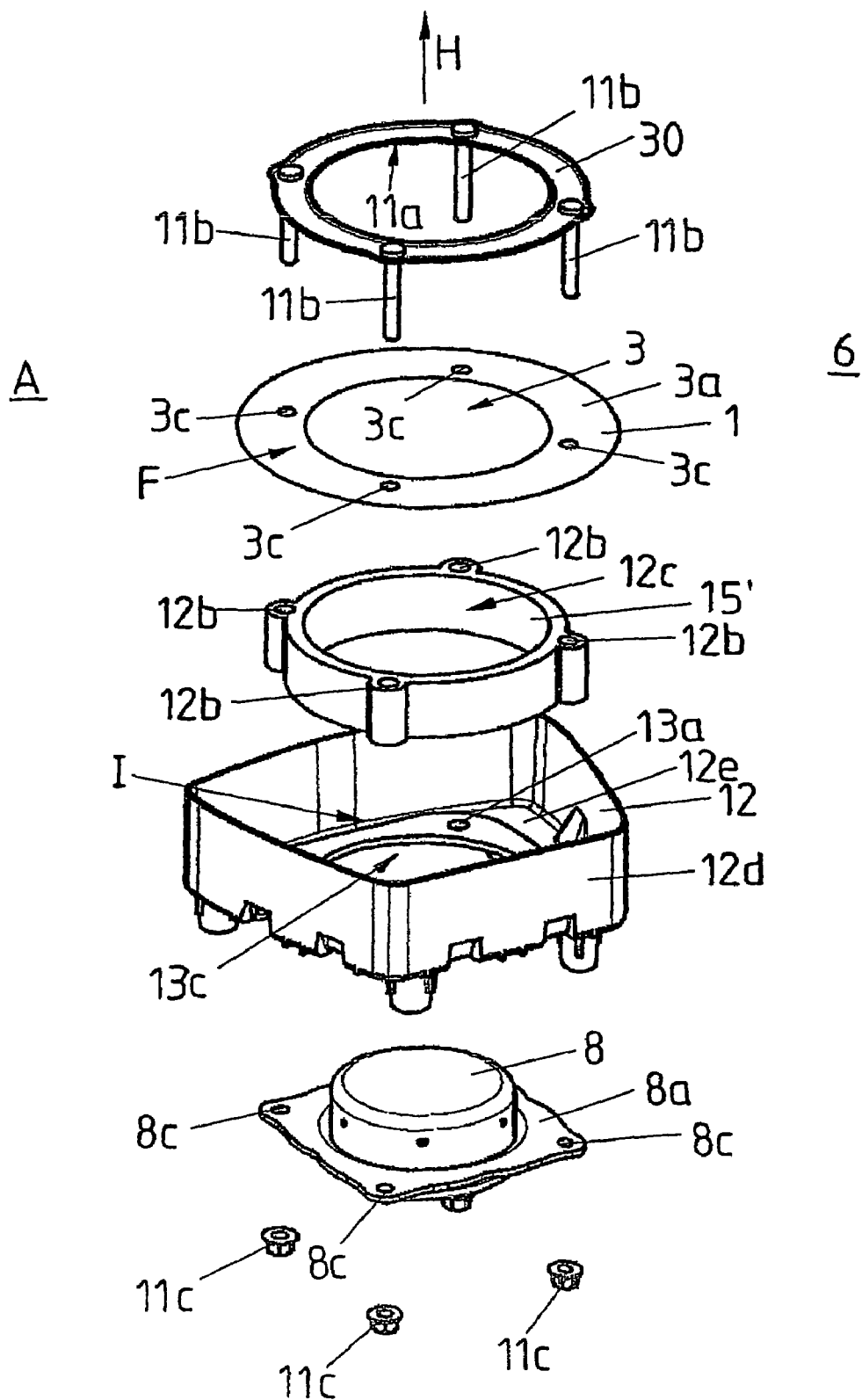

AIRBAG MODULE FOR A MOTOR VEHICLE

CROSS-REFERENCE TO RELATED PATENT APPLICATIONS

This application is a Continuation of International Application PCT/DE2006/001006, which has an international filing date of Jun. 7, 2006; this International Application was not published in English but was published in German as WO 2006/131112.

BACKGROUND

The invention relates to an airbag module for a motor vehicle.

An airbag module of typically includes an airbag that can be inflated with gas in order to restrain an occupant and, upon deployment, is moved in a main deployment direction toward the occupant. The airbag module typically also includes an inflow orifice of the airbag through which gas introduced to inflate the airbag and a continuously running marginal region that defines a surface of the inflow orifice. The surface may characterize the position of the marginal region in space. The airbag module also includes a gas generator to generate the gas for inflating the airbag. The gas emerges from at least one gas outlet orifice of the gas generator and is introduced through the inflow orifice into the airbag. The gas generator is fastened to a base of a generator carrier. The base extends along the surface and separates an inside space of the airbag module, away from the main deployment direction, from an outside space surrounding the airbag module. The main deployment direction of an airbag is generally the direction that the airbag presses against a covering upon deployment such that the covering is opened and the airbag can deploy in the main deployment direction into an outside space surrounding the airbag module. For example, the main deployment direction of a driver's airbag typically coincides with the steering axis of the steering wheel.

SUMMARY

One embodiment of the disclosure relates to an airbag module for a motor vehicle. The airbag module includes an airbag that can be inflated with gas in order to restrain an occupant and upon inflation move in a main deployment direction toward the occupant. The airbag module also includes an inflow orifice of the airbag, through which the airbag can be inflated with gas. The airbag module also includes a continuously running marginal region that defines a plane. The airbag module also includes a gas generator that generates the gas for inflating the airbag. The gas emerges from at least one gas outlet orifice of the gas generator and passes through the inflow orifice into the airbag. The airbag module also includes a generator carrier for carrying the gas generator. The generator carrier has a base that extends along the surface defined by the marginal region of the inflow orifice and to which the gas generator is fastened. The base separates an inside space of the airbag module away from the main deployment direction from an outside space surrounding the airbag module. The airbag module also includes a surface defined by the marginal region of the inflow orifice is spaced apart in the main deployment direction from the base of the generator carrier. The airbag module also includes a continuously running wall protrudes from the base along the main deployment direction and has at least one first outflow orifice through which gas emerging from the gas outlet orifice of the gas generator can pass into the outside space of the airbag module. The airbag module also includes a cylindrical ring includes a clearance arranged displaceably on the wall in a movement direction running around the wall. The clearance is able to be brought into congruence with the first outflow orifice as a result of a displacement of the cylindrical ring in the movement direction to open the first outflow orifice.

BRIEF DESCRIPTION OF THE DRAWINGS

The advantages and features of the invention will become clear from the following FIG. descriptions of exemplary embodiments.

FIG. 12 is a perspective view of a chamber with controllable outflow orifices that surround a gas generator of an airbag module according to another exemplary embodiment.

FIG. 13 illustrates the chamber shown in FIG. 12 with opened outflow orifices according to an exemplary embodiment.

FIG. 17 is a perspective view of the airbag module shown in FIGS. 15 and 16 according to an exemplary embodiment.

FIG. 18 is a perspective view of the airbag module shown in FIGS. 15-17 according to an exemplary embodiment.

FIG. 19 is an exploded view of an airbag module similar to in FIGS. 15-18 according to an exemplary embodiment.

DETAILED DESCRIPTION OF THE PREFERRED EMBODIMENTS

Figure 1:
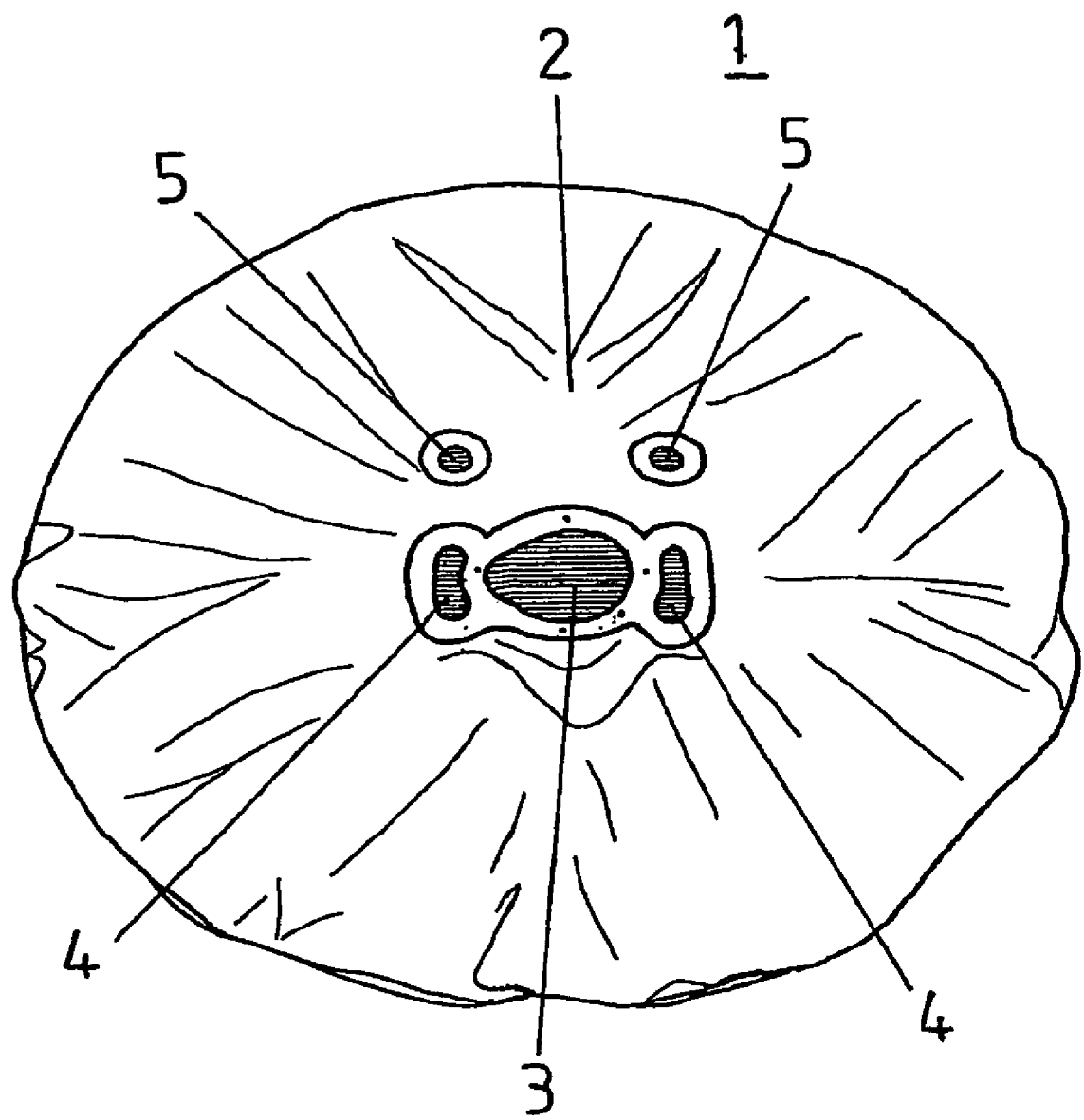
FIG. 1 is a top view of a spread-out airbag with second and third outflow orifices and an inflow orifice according to an exemplary embodiment.

Embodiments of the invention provide an airbag module that has a cost-effective construction and can easily be varied in configuration.

According to an exemplary embodiment, the surface defined by the marginal region of the inflow orifice is spaced apart in the main deployment direction H from the base of the generator carrier.

Due to the spacing between the marginal region of the inflow orifice of the airbag and the base of the generator carrier along the main deployment direction, a construction space is created in which functional components of the airbag module can be interchangeably arranged in the form of spacer pieces that span the distance from the base to the marginal region of the inflow orifice along the main deployment direction. For example, a functional component may be a wall with controllable outflow orifices through which the airbag can be vented.

According to another exemplary embodiment, a wall protrudes perpendicularly from the base along the main deployment direction of the airbag and runs continuously transverse to the main deployment direction. The wall preferably has a marginal region which faces the marginal region of the inflow orifice along the main deployment direction and preferably is positioned in a sheet-like manner against the marginal region of the inflow orifice.

The marginal region of the wall can be substantially congruent with the marginal region of the inflow orifice of the airbag and can be positioned in a form-fitting manner against the marginal region of the inflow orifice of the airbag. The surface F is defined by the marginal region of the inflow orifice and preferably forms a plane with the base of the generator carrier running parallel to the plane. The airbag is fixed on a component of the airbag module via the marginal region of the inflow orifice and is preferably fixed on the marginal region of the wall.

According to another exemplary embodiment, the base of the generator carrier has gas a generator clearance for receiving the gas generator. The gas generator can be arranged in the gas generator clearance of the base in such a manner that a marginal region of the base that borders the gas generator clearance encloses a portion of the gas generator. Alternatively, the gas generator may be introduced fully into the generator carrier along the main deployment direction through the gas generator clearance.

According to still another exemplary embodiment, the wall runs continuously around the gas generator clearance of the base of the generator carrier and is transverse to the main deployment direction. The wall is preferably embodied as a hollow cylinder. The marginal region of the wall is preferably defined by an end side of the wall that faces the airbag and is in the form of a hollow cylinder, i.e. the marginal region of the wall is of a sheet-like and annular design.

The marginal region of the inflow orifice is preferably fixed on the marginal region of the wall so that gas can flow along the wall through the inflow orifice and into the airbag. The marginal region of the inflow orifice preferably is positioned against the marginal region of the wall in a sheet-like manner.

According to another exemplary embodiment, the wall has at least one first outflow orifice that the gas generated by the generator can either pass directly through before it flows into the airbag or can pass into the outside space of the airbag module. The outflow orifice is configured to ventilate and vent the airbag.

According to one embodiment of the invention, a covering of the airbag separates an inside space of the airbag module from an outside space surrounding the airbag module. In a driver's airbag module arranged in a steering wheel, the covering may be, for example, a part of a hub body of the steering wheel. The covering preferably has an openable region through which the airbag can be deployed into the outside space of the airbag module. The openable region may have, for example, tear-open lines that the openable region of the covering is torn open along when the airbag is deployed and presses against the covering in the main deployment direction during inflation.

Preferably, the first outflow orifice is arranged in the inside space of the airbag module so that the gas escaping from it can pass through the openable region into the outside space. There may be a reduced risk of exposure of the gas to a person (e.g. for a driver in the case of a driver's airbag module) since the openable region is covered by the deploying airbag or an airbag which has already deployed. In a driver's airbag there is design freedom on the sides of the steering column or of the area of the steering wheel that faces away from the driver since these sides do not need a flow-optimized or heat-resistant construction for outflow of gas because deployment of the airbag in the direction of a driver.

According to another exemplary embodiment, a movable element with a clearance is mounted displaceably on the wall in a movement direction running around the wall of the generator carrier. The clearance can be brought into congruence with the first outflow orifice as a result of a displacement of the movable element in the movement direction to open the first outflow orifice. The movable element may also be displaced along the movement direction so that the clearance of the movable element is out of congruence with the first outflow orifice of the wall so the outflow orifice is closed by the movable element. The movable element is preferably designed as a cylindrical ring that runs continuously in the movement direction and preferably is positioned against an inside of the wall of hollow-cylindrical design that faces away from the outside space. The continuous clearance formed on the ring may have the shape and size of the first outflow orifice formed on the wall. If a plurality of first outflow orifices are formed along the movement direction on the cylindrical wall, the cylindrical ring has a corresponding plurality of clearances that can be brought into or out of congruence with the first outflow orifices of the wall as a result of a displacement of the ring along the movement direction. A displacement of the ring is in this context may be a rotation of the cylindrical ring about its cylinder axis, for example the ring can bear against the wall and be rotated against the wall. According to other exemplary embodiments a the ring may be translated to open or close the first outflow orifices and the translation may be used in combination with rotation.

The clearance or clearances of the ring is defined so that the ring can be rotated or slid with respect to the wall of the generator carrier into a position in which the ring completely closes the first outflow orifice or the plurality of first outflow orifices. The clearances may likewise be arranged on the ring so that all the first outflow orifices of the wall are opened in a specific position of the ring with respect to the wall.

According to a preferred embodiment, the ring has a recess with a margin extending transverse to the movement direction for displacement of the ring. If the wall is a hollow cylindrical wall, the movement direction may run around the cylindrical wall transverse to the main deployment direction of the airbag or transverse to the cylinder axis of the hollow cylindrical wall). According to another exemplary embodiment, the recess may be a gap that interrupts the ring and extends transverse to the movement direction.

According to a preferred embodiment, a piston of a movement generation device presses against the margin of the recess in the movement direction move the ring out of an initial position, in which the first outflow orifice is closed by the ring, and into another position in which the first outflow orifice is opened. By applying a this tangential force the deformation of the ring may be reduced. To reinforce the ring, the recess may be formed only partially on the ring so that the ring is not completely severed perpendicularly to the movement direction. Preferably, a narrow further recess is provided to sever the ring transversely with respect to the movement direction and that is formed behind the margin of the recess in the movement direction. The further recess runs along the margin of the recess in a direction transverse to the movement direction. If the piston of the movement generation device presses against the margin of the recess in the movement direction the further recess of the ring is pulled away from the movement direction rather than pushed in the movement direction and may further reduce deformation of the ring.

This smaller wall thickness may also be lightweight. The clearance of the ring, which can be brought into congruence with the first outflow orifice in order to open the first outflow orifice, may have a larger area since the deformation of the ring may be reduced. The clearance or clearances may therefore occupy about half of a surface of the ring that faces the wall.

In an alternative embodiment, no outflow orifices are provided in the wall that protrudes perpendicularly from the base of the generator carrier, i.e. the wall is of continuous design along the base of the generator carrier and is therefore of gas-impermeable design.

According to another exemplary embodiment, the wall may be connected integrally to the base of the generator carrier. The wall may also be connected to the generator carrier so that it can only be detached from the generator carrier by destroying a connection (that may not be reversibly releasable) to the generator carrier.

In an alternative embodiment, the wall may define at least a part of a lower module that can be fastened releasably or reversibly to the generator carrier. According to another exemplary embodiment, the lower module preferably also comprises the movement generation device and/or the movable element that interacts with the movement generation device to close and open the first outflow orifices.

Since the wall can be releaseably fixed in the main deployment direction of the airbag between the base of the generator carrier and the marginal region of the inflow orifice of the airbag, an embodiment of the airbag module in which the wall does not have any outflow orifices and spans the distance in the main deployment direction between the marginal region of the inflow orifice of the airbag and the base of the generator carrier (e.g., as a spacer piece in the form of a tube or hollow cylinder), can advantageously be cost-effectively retrofitted with a controlled outflow mechanism. The continuous wall without first outflow orifices (e.g., spacer piece) is removed from the airbag module and replaced by a wall with first outflow orifices. The wall preferably includes a pre-testable control mechanism for controlling the first outflow orifices and at least the ring mounted on the wall and the movement generation device coupled to the ring. Therefore, during retrofitting complete exchange of the generator carrier may be avoided.

According to various exemplary embodiments, the marginal region of the inflow orifice of the airbag is preferably releaseably fixed on the marginal region of the wall with a clamping ring. The clamping ring preferably has at least one fastening element that protrudes away from the main deployment direction and is guided in the main deployment direction by a clearance of the marginal region of the inflow orifice of the airbag and by a passage hole that is aligned with the clearance in the base of the generator carrier. An end section of the fastening element protrudes away from the main deployment direction from the base of the generator carrier. The end section preferably reaches through a clearance formed on a flange of the gas generator so the gas generator can be fixed on the base of the generator carrier by a screw of the end section and a fastening element such as a nut. The clamping ring presses against the marginal region of the inflow orifice of the airbag in the main deployment direction to clamp the marginal region in the main deployment direction between the clamping ring and the marginal region of the wall. If the wall is manufactured separately from the base of the generator carrier the fastening element may also fasten the wall to the base of the generator carrier. The flange of the gas generator through preferably runs continuously around the gas generator annularly and is positioned in a sheet-like manner against a marginal region that runs continuously around the gas generator clearance of the base of the generator carrier.

According to another exemplary embodiment, the airbag has a second outflow orifice or a plurality of second outflow orifices through which gas can escape from the airbag in the outside space surrounding the airbag module. The at least one second outflow orifice is arranged in the inside space of the airbag module so gas emerging from the second outflow orifice can pass through the openable region of the covering of the airbag module into the outside space surrounding the airbag module when in an inflated state.

When the airbag is blocked up early in an out-of-position situation, for example because of high gas pressure in the inside space of the airbag module, good ventilation through the second outflow orifices is possible so the load is reduced on the driver in an early phase of the deployment of the airbag.

According to another exemplary embodiment, the system may prevent a situation where gas emerges from the first and the second outflow orifices can flow opposite to the main deployment direction.

According to another exemplary embodiment, the airbag has a third outflow orifice for the discharge of gas. The third orifice is arranged in the outside space of the airbag module when the airbag is deployed. The third outflow orifices may allow more reliable venting of a standing or already deployed airbag.

In the inflated state of the airbag the third outflow orifice is preferably arranged on a side that faces the airbag module, for example a side of the airbag that faces away from the driver so that gases flowing out of the airbag are not aimed directly at or swirled around to a person to be restrained by the airbag.

The airbag module preferable includes a further third outflow orifice that serves for the discharge of gas and, with an airbag deployed, is arranged in the outside space of the airbag module. In the inflated state of the airbag, the further third outflow orifice lies opposite the third outflow orifice transverse to the main deployment direction of the airbag so that. In, for example, a symmetrically constructed driver's airbag the gas radiation behavior may be more symmetrical and the airbag can be uniformly or spatially vented.

The first, second, and third outflow orifices may be combined with one another and coordinated with one another. The second and third outflow orifices in the airbag may replace the standard outflow orifices with which an airbag is normally equipped. The coordination of the area of the second outflow orifices with respect to the third outflow orifices, for example the coordination of the ratio of the two areas facilitates the in-position performance (i.e., the airbag can be deployed freely and unimpeded) of an airbag.

While the second and third outflow orifices may be permanently open, the first outflow orifices may be switchable or controllable. The opening of these first outflow orifices takes place as a function of time after the ignition of the gas generator, for example by a pyrotechnic movement generation device. In the event of a premature opening of these first outflow orifices, the mass flow of the gas generator is blown off beneath an airbag tie-up (e.g., by a clamping of a marginal region of the airbag running continuously around the inflow orifice on the circumferential marginal region of the wall of the generator carrier) so the amount of airbag fill can be controlled. For example, lighter occupants (e.g., 5% of capacity) may be more effectively restrained by a "softer" airbag by additional second and third outflow orifices. In the event of a later opening of the switchable or controllable first outflow orifices, the restraining performance for heavy occupants (e.g., 50% capacity, 95% capacity, etc.) may be improved. The deployment of the airbag may be assisted (e.g., early restraint due to a rapid airbag provision) by an improved detection of the acceleration values of a vehicle occupant in an accident triggering the airbag module. Improved damping of the airbag as a function of the occupant can be set by selecting the time of opening of the additional outflow area (e.g., first outflow orifices). Setting the opening time point may take place automatically on the basis of occupant sensing (e.g., by size, weight, position, etc.) and/or a sensing of crash-dependent data (e.g., deceleration, speed, etc.).

In some out-of-position situations (e.g., even before ignition of the gas generator), the early opening of the switchable first outflow orifices may additionally reduce the gas pressure in the airbag and further reduce the load on the occupant when hit by the airbag.

The gases flowing into the airbag module may not flow through orifices of a generator carrier further downward (e.g., along the steering axle into the steering wheel body), but instead may be deflected along the steering axle or the main deployment direction of the airbag in the direction of the openable region of the covering of the airbag module. The emergence of the gas takes place along the airbag through the openable region of the covering. Even in an out-of-position situation the body parts of an occupant near the airbag module may be covered sufficiently by the airbag to avoid occupant exposure to the hot gases that have flowed out. The flow path may not adversely affect adjacent subassemblies and thus additional measures on the steering wheel to ensure the outflow may be unnecessary.

FIG. 1 shows an airbag 1 designed for use as a driver's airbag. The airbag 1 is spread out along a plane of extent coinciding with the paper plane and is produced from two circular gasbag plies. The continuous margins of the airbag may be stitched, adhesively bonded, woven, welded, or otherwise fastened to one another to form the airbag. The airbag 1 has a side 2 that faces an airbag module 6 (not shown in FIG. 1) when in an inflated state or faces away from a driver to be restrained by the inflated airbag 1. On the side 2 of the airbag 1, an inflow orifice 3 (e.g., a circular orifice) provides a central path through which gas for inflating the airbag 1 can be introduced.

The airbag 1 has two second outflow orifices 4 which are formed on two mutually opposite marginal regions of the inflow orifice 3 and which extend longitudinally along the inflow orifice 3. These two second outflow orifices 4 are arranged adjacently to the injection orifice 3 so that they are arranged in an inside space 1 of the airbag module 6 when in the inflated state.

The airbag 1 has third outflow orifices 5 which are located at a distance from the center of the circular inflow orifice 3 that is greater than the distance of the second outflow orifices 4 from the center of the inflow orifice 3. The third orifice distances may be large enough that the third outflow orifices 5 are arranged outside the inside space I of the airbag module 6, specifically in the outside space A surrounding the airbag module.

Figure 2:
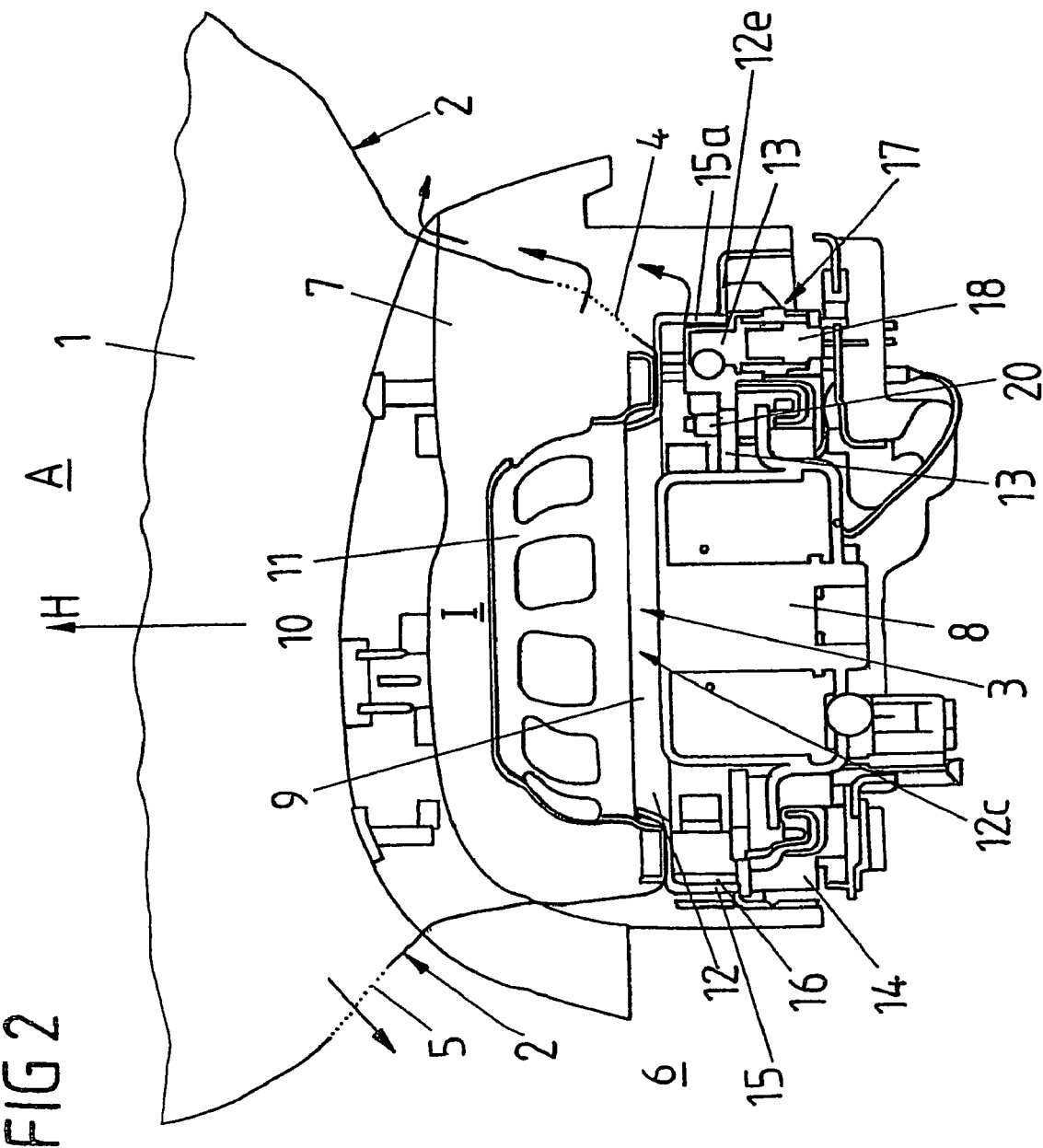
FIG. 2 is a partial section view of an airbag module with first, second and third outflow orifices according to an exemplary embodiment.
Figure 4:
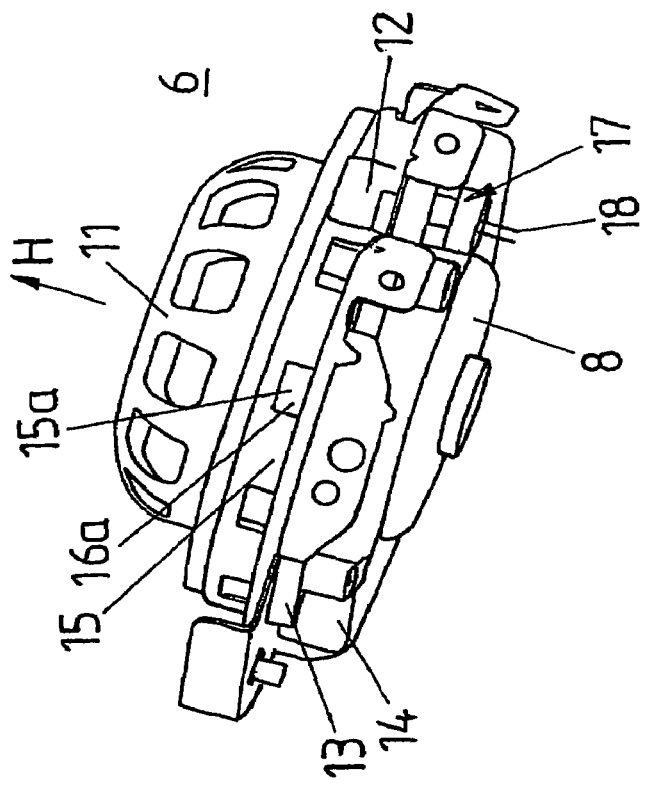
FIG. 4 is a perspective view of the airbag module shown in FIG. 3, with opened first outflow orifices according to an exemplary embodiment.
Figure 3:
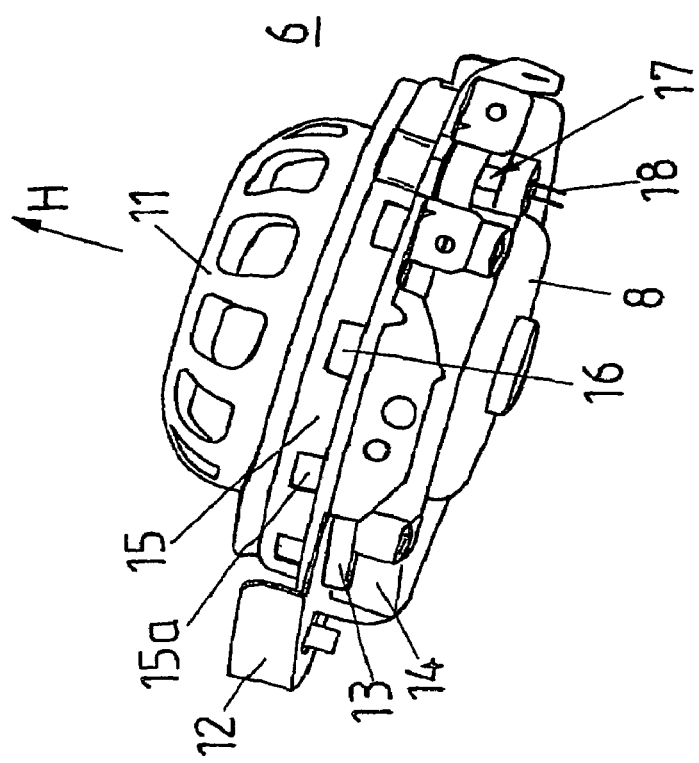
FIG. 3 is a perspective view of an airbag module with closed first outflow orifices according to an exemplary embodiment.
Figure 6:
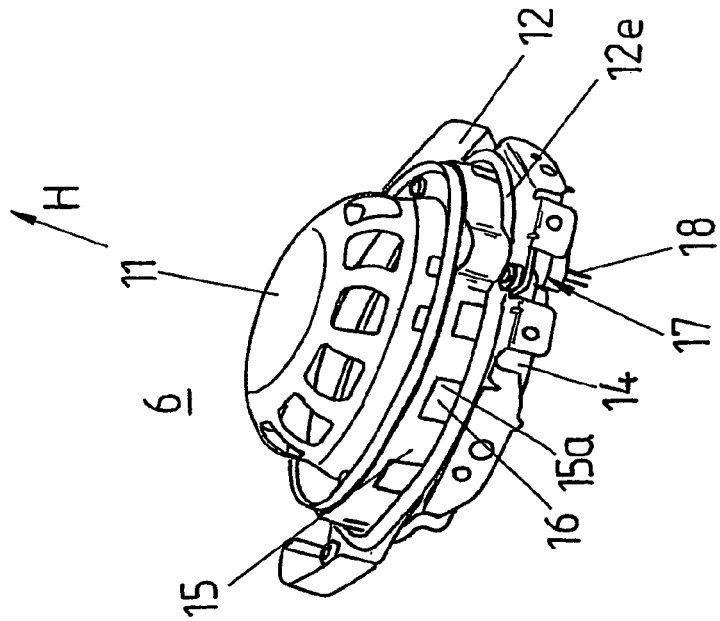
FIG. 6 is a perspective view of the airbag module shown in FIG.5 in an assembled state according to an exemplary embodiment.

FIG. 2 shows, in conjunction with FIGS. 3 to 7, a partial section view of the airbag module 6 with a covering 7 that forms a receptacle for the airbag 1 and for a gas generator 8 and a chamber 9 surrounding the gas generator 8.

The covering 7 of the airbag module 6 separates the inside space I from the outside space A of the airbag module 6. On the covering 7 of the airbag module 6, an openable region 10 can tear open, for example along predefined tear-open lines, due to gas pressure building up in the airbag 1 after activation of the gas generator 8 presses from the inside space I against the openable region 10 in a main deployment direction H. The inside space I may be a space of the airbag module 6 in which the airbag 1 is arranged in its uninflated state and that is delimited by the unopened covering 7 in the main deployment direction H.

FIG. 2 shows the airbag module 6 after the airbag 1 (an portion of which is illustrated in FIG. 2) has spread out through the openable region 10 of the covering 7 into the outside space A. The third outflow orifices 5 of the airbag 1 are arranged in the outside space A and the second outflow orifices 4 are arranged in the inside space I of the airbag module 6. The flow path is identified in FIG. 2 by corresponding arrows.

While the gas located in the airbag 1 can flow through the third outflow orifice 5 directly into the outside space A, the gas may be introduced through the second outflow orifice 4 into the inside space I first before travelling through the openable region 10 into the outside space A.

The chamber 9 surrounding the gas generator 8 is defined by a diffuser 11, a generator carrier 12, a bottom plate 13 and a carrier 14 that oscillatably mounts the gas generator 8. The diffuser 11 has a cap-shaped design and projects in the main deployment direction H through the inflow orifice 3 into the inflated airbag 1. A marginal region 3a of the inflow orifice 3 runs continuously around the inflow orifice 3 of the airbag 1 is clamped in the main deployment direction H between a continuous marginal region 11a of the diffuser 11 and a continuous marginal region 12a of a cylindrical wall 15 of the generator carrier 12. The continuous marginal region 12a runs continuously around a central orifice 12c facing the inflow orifice 3 of the generator carrier 12. A small surface F is defined by the continuously running marginal region 3a of the inflow orifice 3 and is spaced apart from the base 12e of the generator carrier 12 along the main deployment direction H.

The diffuser 11 and the generator carrier 12 are connected to one another via four fastening elements 11b that project longitudinally from the marginal region 11a in the main deployment direction H. The four fastening elements 11b are arranged along the annular marginal region 11a equidistantly from the next respective adjacent neighbor. The four fastening elements 11b are guided through passage holes 12b that are assigned to the fastening elements 11b and are formed on the marginal region 12a of so that free end portions of the fastening elements 11b project from a side of the marginal region 12a, which faces away from the diffuser 11. The projecting free end portions are introduced into continuous holes 13a of the bottom plate 13, which are formed in cylindrical fastening regions 13b that with the holes 13a are in alignment with the fastening elements 11b and the main deployment direction H.

A circular gas generator clearance 13c is provided in the center of the bottom plate 13 and lies opposite the central orifice 12c and the inflow orifice 3 in the main deployment direction H. The essentially cylindrically designed gas generator 8 is introduced in the main deployment direction H into the gas generator clearance 13c. The gas generator 8 is connected oscillatably to a carrier 14 of trough-shaped design via a flange 8a which projects from and continuously around the gas generator 8 transverse to the main deployment direction H. An oscillatable tie-up of the gas generator 8 on the carrier 14 via the flange 8a may not be necessary. The flange 8a itself may be shaped as the carrier 14, so that the carrier 14 and the gas generator 8 are connected to one another directly.

The carrier 14 is secured to free ends of the end portions of the fastening element 11b that are led through the holes 13a and closes the chamber 9 on a side lying opposite the diffuser 11 in the main deployment direction H.

The cylindrical wall 15 is oriented perpendicularly to and runs continuously around the central orifice 12c and the gas generator clearance 13c is annularly transverse to the main deployment direction H. The cylindrical wall defines a plurality of first outflow orifices 15a that can be closed or opened by a movable element, for example a cylindrical ring 16.

The cylindrical ring 16 bears against an inside portion of wall 15 facing the gas generator 8 and is mounted so that it is displaceable between two positions on the inside of the wall 15 in a movement direction B that runs transverse to the main deployment direction H and continuously around the cylindrical wall 15. The cylindrical ring 16 can be rotated about its cylinder axis coinciding with the main deployment direction H between the two positions.

Clearances 16a configured similar to the first outflow orifices 15a are provided on the ring 16 and are arranged along the cylindrical ring 16 so they can be brought into congruence with the first outflow orifices 15a. If the first outflow orifices 15a and clearances 16a are brought into congruence, the first outflow orifices 15a may be opened completely, so that gases provided by the gas generator 8 can pass through the first outflow orifices 15a into the inside space I and into the outside space A of the airbag module 6. By rotating or displacing ring 16, the clearances 16a can be brought out of congruence with the first outflow orifices 15a so that the first outflow orifices 15a are closed.

Figure 7:
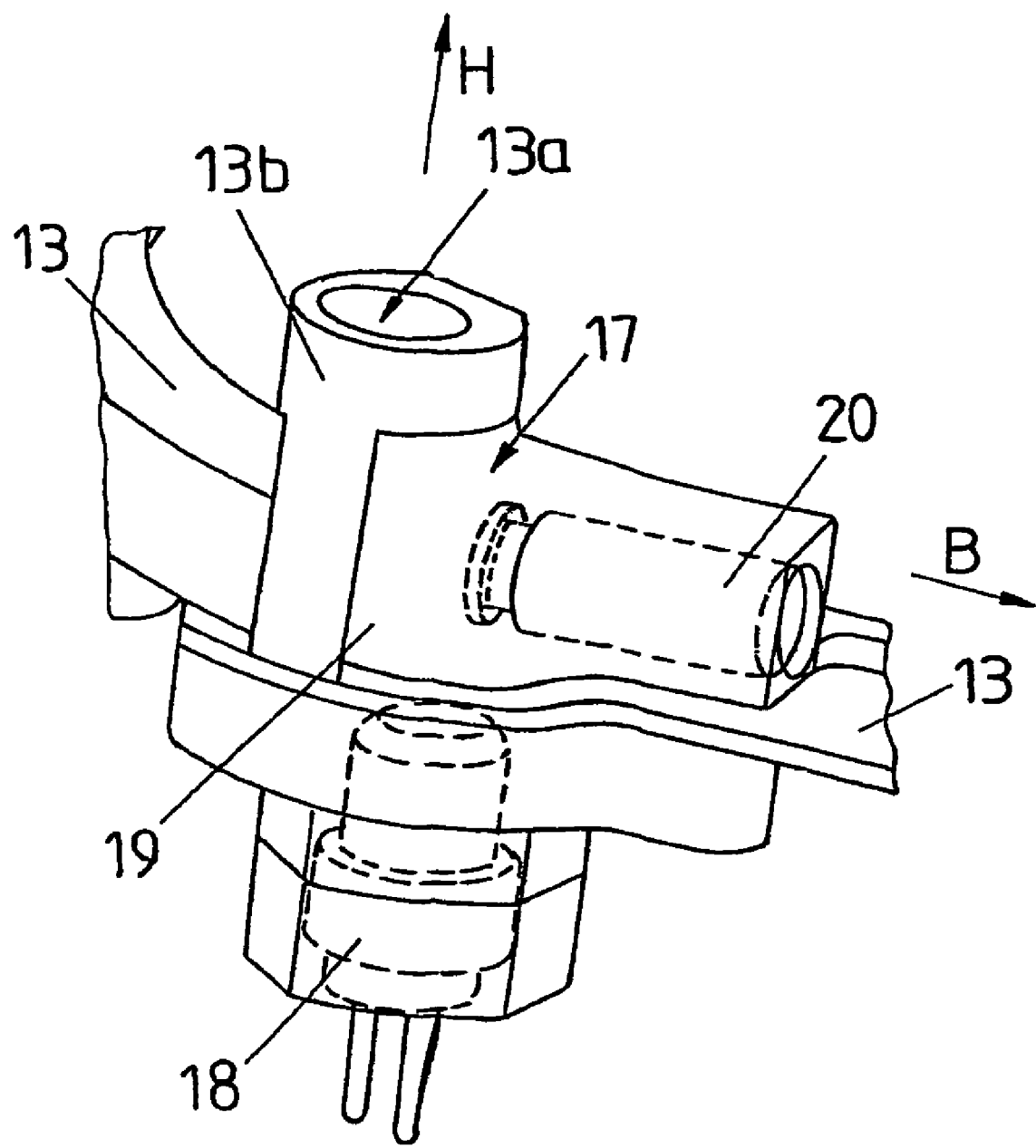
FIG. 7 is a pyrotechnic movement generation device with an igniter and a piston of the airbag module of FIG. 3 according to an exemplary embodiment.

The cylindrical ring 16 may be displaced in the movement direction B to open the initially closed outflow orifices 15a by a movement generation device 17 (e.g., a pyrotechnic actuator) on the bottom plate 13 according to FIG. 7.

According to FIG. 7, the movement generation device 17 has an igniter 18 that is activatable or ignitable by control electronics and that can generate an excess pressure in a pressure chamber 19 formed on the bottom plate 13 to press a longitudinally extended piston 20 mounted movably in the pressure chamber 19 out of the pressure chamber 19 in the movement direction B.

The piston 20 is arranged to transmit movement in the movement direction B in a recess 21 of the ring 16. The recess interrupts the ring 16 in the movement direction B and the piston 20 is arranged so that an excess pressure provided in the pressure chamber 19 presses in the movement direction B against a margin 22 that runs transverse to the movement direction B, of the recess 21 of the ring 16. The ring 16 is rotated in the movement direction B with respect to the wall 15 to open the first outflow orifices 15a. The recess 21 may also be one of the clearances 16a in the ring 16.

It may be advantageous that the piston 20 is arranged in the movement direction B between the margin 22 and a further margin lying opposite the margin 22 of the recess 21, for example so that the piston can press tangentially with respect to the ring 16 against the edge of margin 22. Deformation of the ring 16 if a piston 20 presses, spaced apart radially from the ring 16, against a region projecting from the ring to rotate the ring with respect to the wall 15 may be reduced. The piston 20 allows production of the ring 16 with improved materials and of less weight.

Guide means, which guide the cylindrical ring 16 in the movement direction B, can be provided on the generator carrier 12 and/or on the bottom plate 13 so the ring 16 can be displaced more reliably along the wall 15 by the piston 20. The bottom plate 13 may have a guide means embodied as a step that runs continuously around the gas generator clearance 13c and along which a margin facing the bottom plate 13 of the ring 16 can slide.

Figure 5:
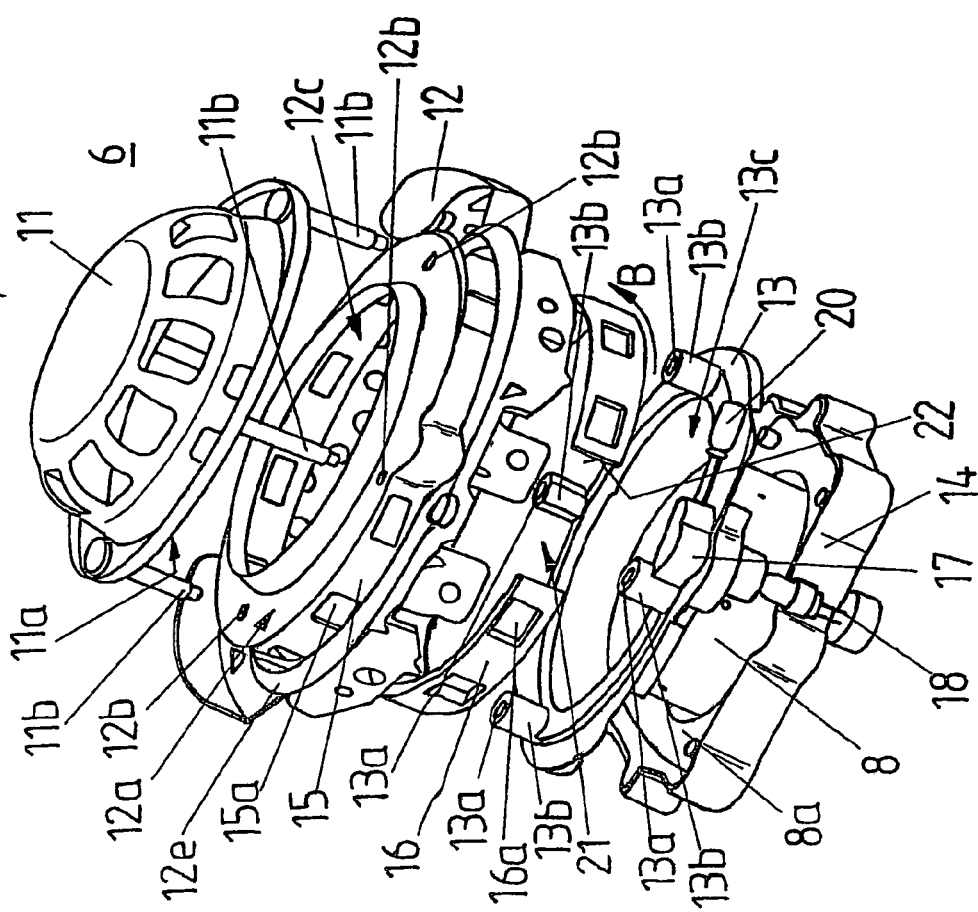
FIG. 5 is an exploded illustration of the airbag module shown in FIG. 3 and FIG. 4 according to an exemplary embodiment.
Figure 8:
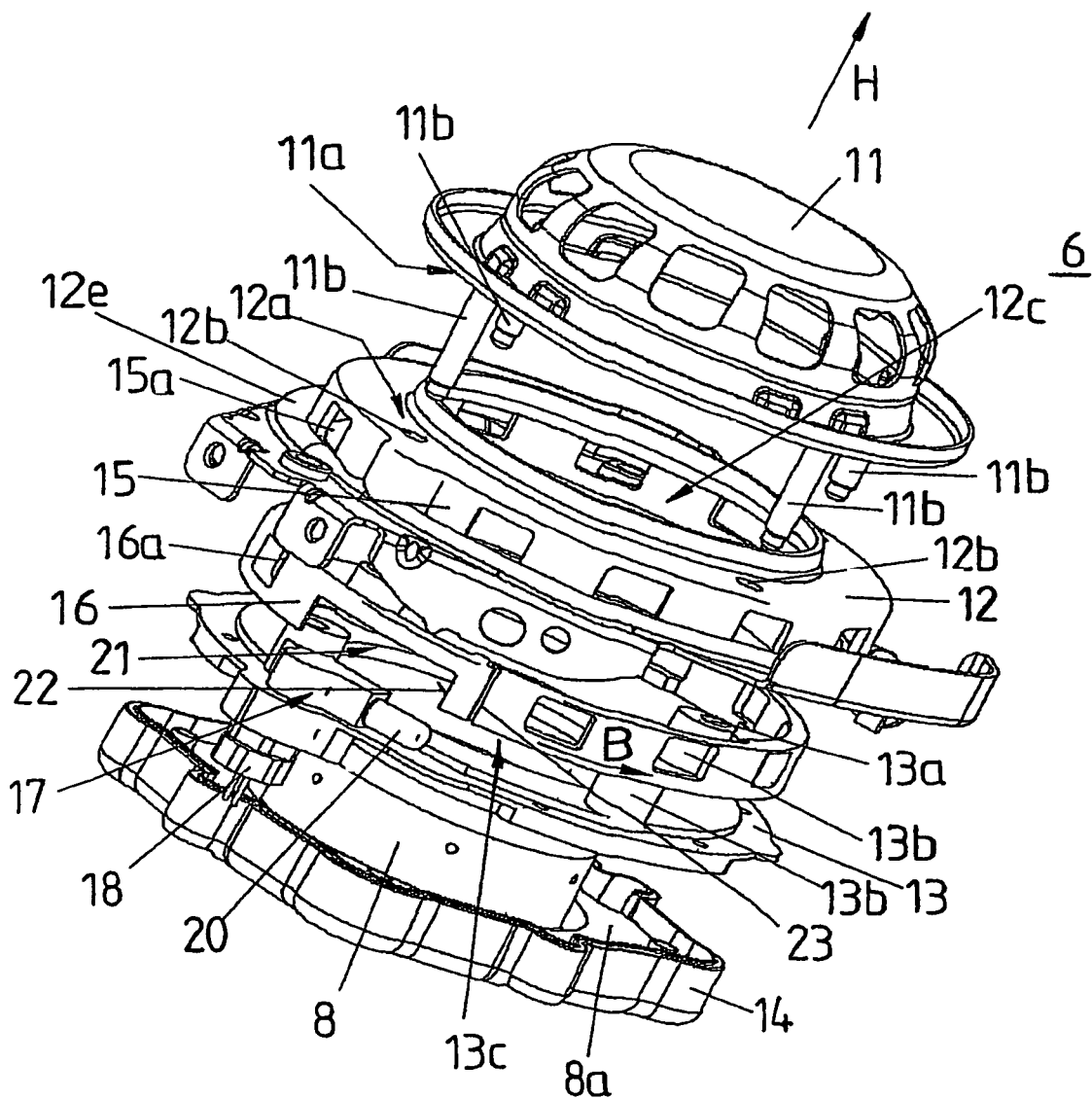
FIG. 8 is a perspective exploded view of an airbag module similar to in FIGS. 3-6 according to another exemplary embodiment.

FIG. 8 shows a modification of the airbag module 6 shown in FIG. 5 in which the ring 16 is not interrupted in the movement direction B by the recess 21. The recess 21 of FIG. 5 is defined in the ring 16 and has a margin 22 running transverse to the movement direction B that the piston 20 can press against in order to displace the ring 16. However, in the airbag module 6 illustrated in FIG. 8, the ring 16 is not pushed in the movement direction B by the piston 20, but instead, is pulled by the piston 20 pressing against the margin 22. In front of the margin 22, a further recess 23 (e.g., a gap) is defined that runs parallel to the margin 22 and interrupts the ring 16. The pulling action may reduce the deformation of the ring 16 by the piston 20.

Figure 10:
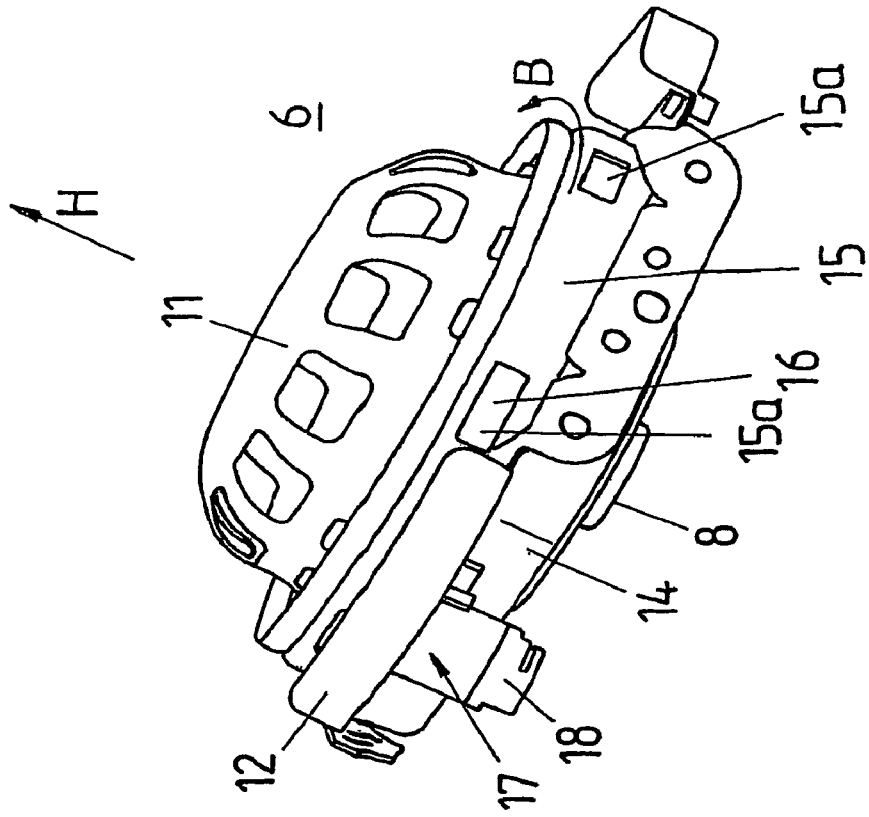
FIG.10 is a perspective view of the airbag module shown in FIG.9 with closed first outflow orifices according to an exemplary embodiment.
Figure 9:
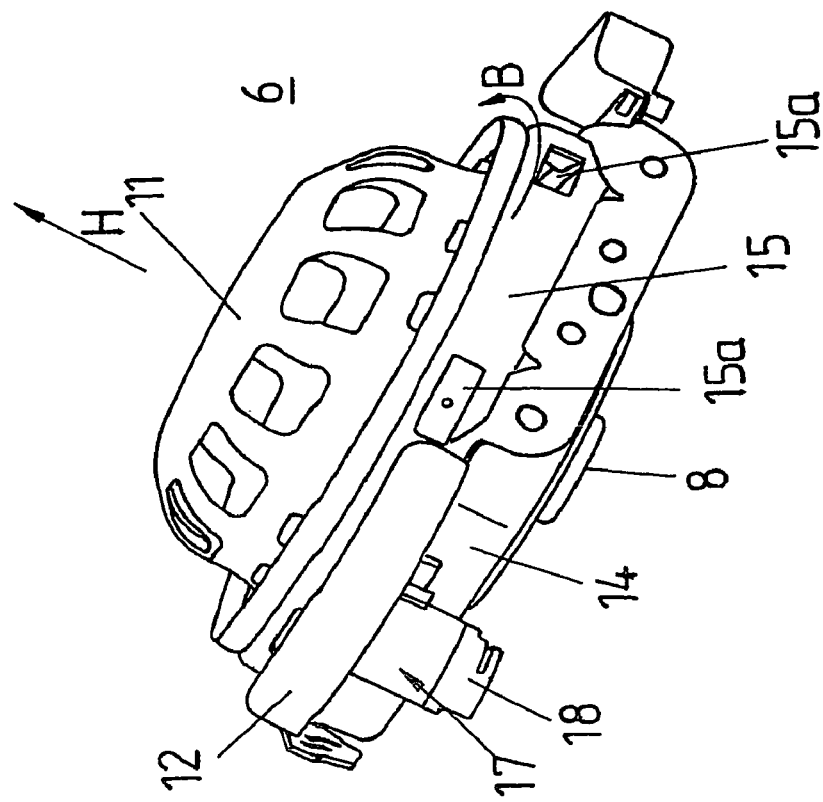
FIG. 9 is a perspective view of an airbag module with first outflow orifices which are opened for the discharge of gas according to another exemplary embodiment.
Figure 11:
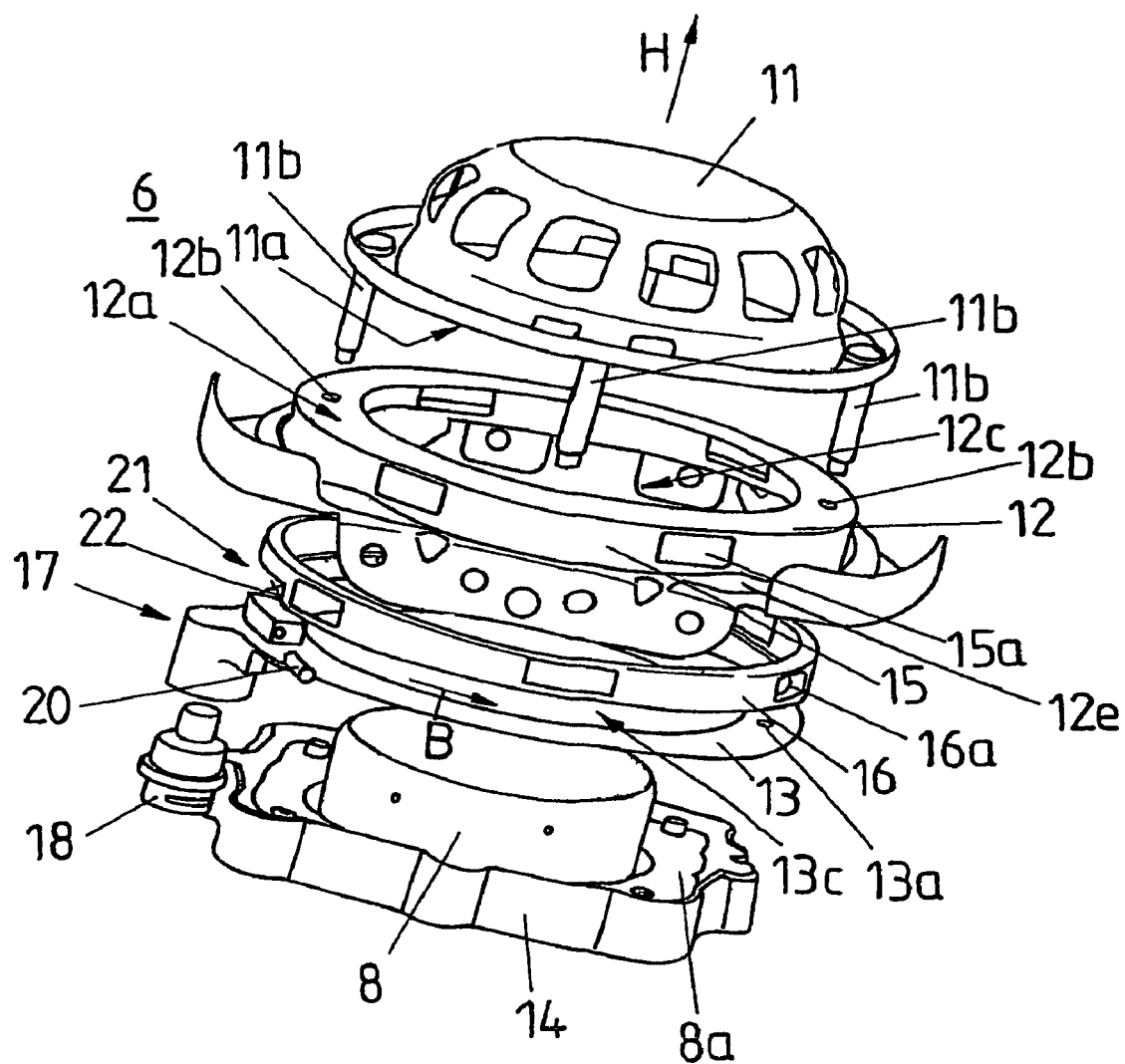
FIG. 11 is a perspective exploded view of the airbag module shown in FIGS. 9 and 10 according to an exemplary embodiment.

FIG. 9 shows in conjunction with FIGS. 10 and 11, a further modification of the airbag module 6 shown in FIG. 5 and FIG. 8. In contrast to FIG. 5 or FIG. 8, a recess 21 on the ring 16 does not interrupt the ring 16, which closes on itself, so that the piston 20 pushes the ring 16 in the movement direction B. The ring 16 may have an essentially U-shaped cross section or a comparable profiling and be deformed to a lesser extent by the piston 20 during displacement from the wall 15.

Figure 14:
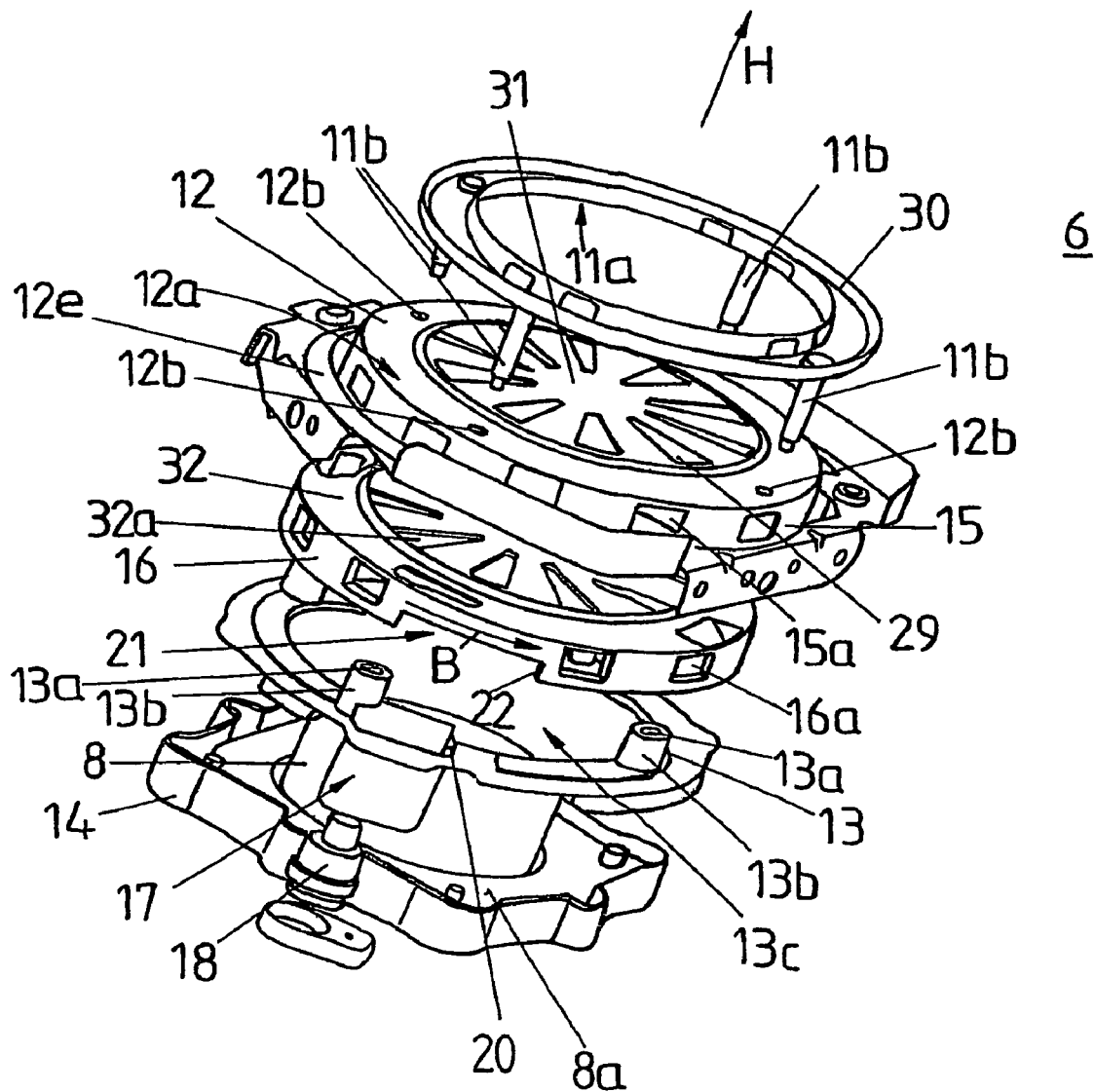
FIG. 14 is a perspective exploded view of the airbag module shown in FIGS. 12 and 13 according to an exemplary embodiment.

FIG. 12 shows, in conjunction with FIGS. 13 and 14, a perspective view or exploded view of an extract of an airbag module 6. The generator carrier 12 of the airbag module has no permanently open central orifice 12c, but instead a plurality of outflow orifices 29 that are arranged in a radiating manner and through which gas can pass out of the chamber 9 of the airbag module 26 via the inflow orifice 3 into the airbag 1. The outflow orifices 29 face the inflow orifice 3 in the main deployment direction H of the airbag 1.

The outflow orifices 29 may be configured so the gas that passes through to inflate the airbag 1 is swirled and so the diffuser 11 may be omitted. The airbag module 6 illustrated in FIGS. 12 to 14 may have only a clamping ring 30 on which (see FIG. 5) the marginal region 11a is formed that faces the generator carrier 12 and presses a marginal region 3a running continuously around the inflow orifice 3 against the generator carrier 12 and secures the airbag 1 on the generator carrier 12. The fastening elements 11b project against the clamping ring 30 in the main deployment direction H.

To close the outflow orifices 29 of the generator carrier 12, in contrast to FIGS. 2 to 11, the ring 16 includes a valve plate 32 having a plurality of orifices 32a that can be brought into congruence with the outflow orifices 29 of the outflow region 31 of the generator carrier 12. The valve plate 32 and the fastened ring 16 fastened (e.g., by a fastener, the ring 16 and valve plate 32 may be produced in one piece, etc.) can be rotated in a movement direction B running transverse to the main deployment direction H. Valve plate 32 and ring 16 can be rotated about an axis perpendicular to the valve plate 32 that coincides with the main deployment direction H, while the orifices 32a of the valve plate 32 can be brought into congruence with the outflow orifices 29 to open the outflow orifices 29 of the outflow region 31. To close the outflow orifices 29, the valve plate 32 may be rotated so the orifices 32a come out of congruence with the outflow orifices 29. Since the valve plate 32 is coupled to the ring 16, the valve plate 32 can be moved in the movement direction B via the movement generation device 17 illustrated in FIGS. 2 to 11. The outflow orifices 29 are defined in the outflow region 31 of the generator carrier 12 so the first outflow orifices 15a of the cylindrical wall 15 are opened and the outflow orifices 15a are closed by the ring 16 and are congruent with the orifices 32a formed on the valve plate 32.

Figure 15:
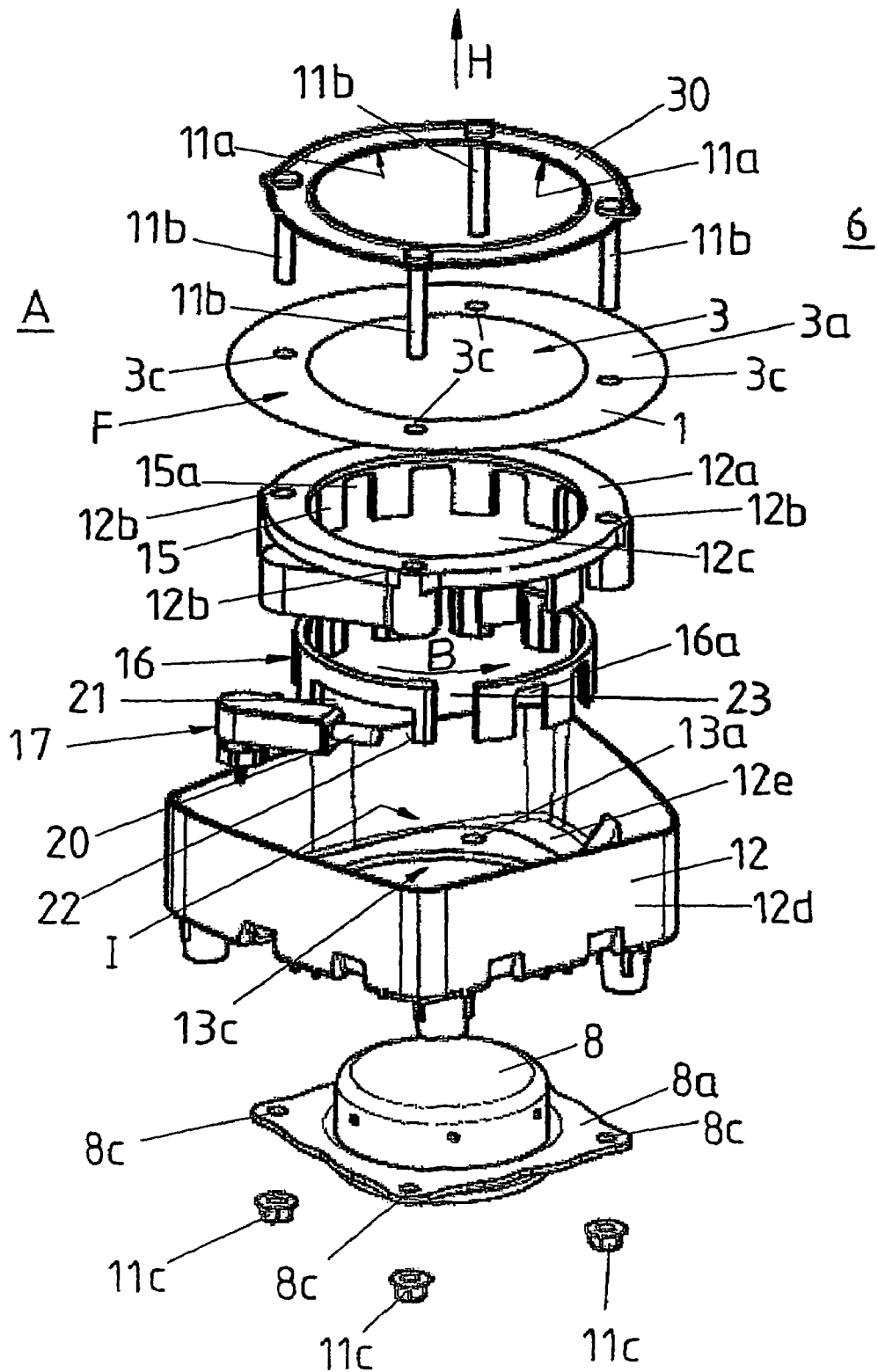
FIG. 15 is an exploded view of an airbag module to in FIGS. 5, 8 and 11 according to an exemplary embodiment.
Figure 16:
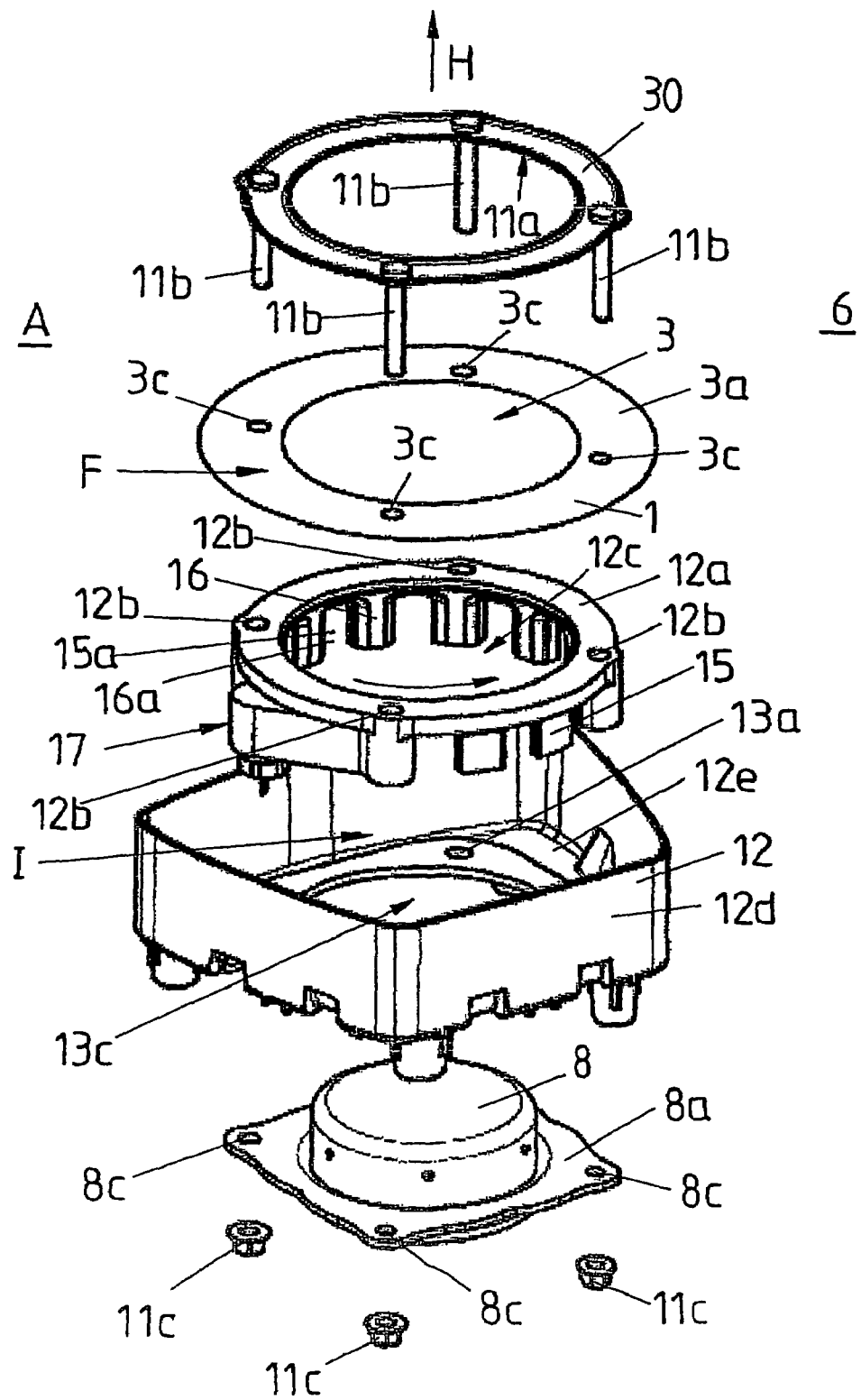
FIG. 16 is an exploded view of the airbag module shown in FIG. 15 with a preassembled lower module that includes a cylindrical wall, a ring arranged displaceably on the wall, and a movement generation device for moving the ring according to an exemplary embodiment.

FIG. 15 shows, in conjunction with FIGS. 16 to 18, a modification of the airbag module 6 shown in FIGS. 5, 8 and 11. In contrast to the exemplary embodiments, the cylindrical wall 15, which runs continuously around the gas generator clearance 13c of the base 12e, may not be connected integrally to the generator carrier 12 but may include an element that can be connected separately to the generator carrier 12.

The airbag module 6 shown in an exploded illustration in FIG. 15 may be implemented in a motor vehicle steering wheel and can be rotated about a steering axis. The airbag module includes a generator carrier 12 that receives a gas generator 8, a lower module for controlling outflow of gas, and the airbag 1 in a folded state. The lower module includes a cylindrical wall 15, a cylindrical ring 16 of one of the types shown in FIGS. 5, 8 and 11, and a movement generation device 17 of the type shown in FIG. 7. The ring 16 can be displaced in relation to the cylindrical wall 15 such that first outflow orifices 15a that are formed on the cylindrical wall 15 and closed by the ring 16 can be opened by displacement of the ring 16 to allow gas to flow out of the airbag 1.

The generator carrier 12 has a base 12e extending perpendicular to the main deployment direction H with an outer continuously running margin from which an outer wall 12d protrudes and connects the base 12e to a covering 7 (not shown), for example as shown in FIG. 2. The covering 7 may run essentially parallel to the base 12e. The main deployment direction H of the airbag 1 runs parallel to the steering axis of the steering wheel the airbag module 6 is fitted into.

The base 12e of the generator carrier 12 has a central gas generator clearance 13c with a marginal region that runs continuously around the gas generator clearance 13c of the base 12e from which the cylindrical wall 15. The clearance 13c can be fixed releaseably on the base 12e with the wall 15 running continuously around the clearance 13c transverse to the main deployment direction H. First outflow orifices 15a are each defined on an end side of the cylindrical wall 15 that faces the base 12e.

A cylindrical ring 16 of the type shown in FIG. 8 is mounted displaceably on the cylindrical wall 15 in a movement direction B that runs continuously around the gas generator clearance 13c transverse to the main deployment direction H. According to FIG. 8, the ring 16 has clearances 16a that are out of congruence with the first outflow orifices 15a of the cylindrical wall 15 when in an initial position. In the initial position of the ring 16, the first outflow orifices 15a are closed, and gas emerging from the gas generator 8 passes in the main deployment direction H past the first outflow orifices 15a through the inflow orifice 3 into the airbag 1. To open the first outflow orifices 15a, the ring 16 can be displaced by the movement generation device 17 into a position that the clearances 16a of the ring 6 are arranged congruently with the first outflow orifices 15a so the first outflow orifices 15a are opened. The piston 20 of the movement generation device 17 according to FIGS. 5 and 8 presses in the movement direction B against the margin 22 of the recess 21 of the ring 16. In contrast to FIG. 8, the clearances 16a of the ring 16 are correspond to the first outflow orifices 15a of the cylindrical wall 15 so they reach in the main deployment direction H as far as the base 12e.

The cylindrical wall 15 has a marginal region 12a that runs continuously in the main deployment direction H and borders the central orifice 12c that lies opposite the inflow orifice 3 of the airbag 1 in the main deployment direction H (e.g., as in FIGS. 2, 5, 8 and 11). The marginal region 12a extends along a plane of extent (surface F) running essentially parallel to the base 12e and positioned in a sheet-like manner against the marginal region 3a bordering the inflow orifice 3. The marginal region 3a is arranged in the main deployment direction H between a clamping ring 30 (e.g., of the type shown in FIG. 14) and the marginal region 12a of the cylindrical wall 15.

Four fastening elements 11b protrude away from the main deployment direction H and are arranged equidistantly from one another along the clamping ring 30. The four fastening elements 11b reach through clearances 3c that are defined on the marginal region 3a of the airbag 1. Passage holes 12b of the cylindrical wall 15 extend in the main deployment direction H receive the fastening elements 11b to fix the clamping ring 30 on the cylindrical wall 15 and are aligned with the clearances 3c. The passage holes 12b open on an end side of the wall 15 and are aligned with holes 13a that are formed on the marginal region of the generator clearance 13c. The length of the fastening elements 11b in the main deployment direction H allow protrusion through the passage holes 12b and holes 13a of the marginal region so the free end sections of the fastening elements 11b protrude in the opposite direction to the main deployment direction H.

A gas generator 8 is introduced into the gas generator clearance 13c in the main deployment direction H. The gas generator 8 includes a flange 8a that runs continuously around the gas generator 8 and bears against a continuously running marginal region that borders the gas generator clearance 13c. The flange 8a of the gas generator 8 has clearances 8c for fastening the gas generator 8 to the generator carrier 12. The clearances 8c are aligned with the holes 13a of the base 12e and of the free end sections of the fastening elements 11b. the fastening elements 11b reach through the holes 13a and clearances 8c in the main deployment direction H of the airbag 1. The free end sections of the fastening elements 11b include threads onto which nuts 11c are screwed. The end sections protrude from the flange 8a of the gas generator 8 in the opposite direction to the main deployment direction H. The marginal region 3a is clamped between the clamping ring 30 and the marginal region 12a by the fastening elements 11b. The wall 15 (e.g., in the event of a wall 15 formed separately) and the gas generator 8 are fastened to the base 12e of the generator carrier 12.

FIGS. 17 and 18 show the completely fitted airbag module 6 an outside that faces away from the airbag 1 and from a topside that faces a drive. FIG. 16 shows an exploded illustration of the airbag module 6 shown in FIG. 15, with the lower module comprising the cylindrical wall 15 and the ring 16 and the movement generation device 17 fitted.

FIG. 19 shows a modification of the airbag module 6 shown in FIGS. 15 to 18 in which the lower module 15, 16, 17 of FIGS. 15 and 16 is replaced by a further cylindrical wall 15' that runs continuously around the gas generator clearance 13c transversely with respect to the main deployment direction H, i.e. it does not have any outflow orifices for discharging gas. The exchange of the lower module 15, 16, 17 for the further cylindrical wall 15' is possible because both components can be fixed releaseably to the generator carrier 12. The further cylindrical wall 15' without outflow orifices 15a has similar dimensions to the wall 15 (with outflow orifices 15a), i.e. the heights of the cylindrical walls 15, 15' in the main deployment direction H and the spatial positions of the passage holes 12b of the cylindrical walls 15, 15' are at least similar. The inner and outer radii of the two continuously running walls 15, 15' may essentially coincide in deployment direction H. No further structural changes need to be made to the generator carrier 12 to exchange the cylindrical wall 15 or the lower module 15, 16, 17 for the further wall 15' (and vice versa). An airbag module 6 without first outflow orifices 15a according to FIG. 19 can be retrofitted in an advantageous and cost-effective manner to form an airbag module 6 with first outflow orifices 15a according to FIG. 15.

The priority application, German patent application no. 10 2005 027 910.4, filed Jun. 10, 2005 including the specification, drawings, claims and abstract, is incorporated herein by reference in its entirety. The priority application, German patent application no. 10 2006 013 359.5, filed Mar. 16, 2006 including the specification, drawings, claims and abstract, is incorporated herein by reference in its entirety. The priority application, German patent application no. 20 2005 020 687.3, filed Dec. 15, 2006 including the specification, drawings, claims and abstract, is incorporated herein by reference in its entirety. The priority application, German patent application no. 20 2005 020 680.6, filed Dec. 15, 2006 including the specification, drawings, claims and abstract, is incorporated herein by reference in its entirety.

Given the disclosure of the invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module for a motor vehicle, comprising:
   an airbag that can be inflated with gas in order to restrain an occupant and upon inflation move in a main deployment direction toward the occupant;
   an inflow orifice of the airbag through which the airbag can be inflated with gas;
   a continuously running marginal region that defines a plane;
   a gas generator that generates the gas for inflating the airbag, wherein the gas emerges from at least one gas outlet orifice of the gas generator and passes through the inflow orifice into the airbag;
   a generator carrier for carrying the gas generator, the generator carrier having a base that extends along the surface defined by the marginal region of the inflow orifice and to which the gas generator is fastened, the base separating an inside space of the airbag module away from the main deployment direction from an outside space surrounding the airbag module;
   a surface defined by the marginal region of the inflow orifice spaced apart in the main deployment direction from the base of the generator carrier;
   a continuously running wall protruding from the base along the main deployment direction, wherein the wall has at least one first outflow orifice through which gas emerging from the gas outlet orifice of the gas generator can pass into the outside space of the airbag module; and
   a cylindrical ring with a clearance being arranged displaceably on the wall in a movement direction running around the wall, wherein the clearance is able to be brought into congruence with the first outflow orifice as a result of a displacement of the cylindrical ring in the movement direction to open the first outflow orifice.

2. The airbag module as claimed in claim 1, wherein the wall has a marginal region facing the marginal region of the inflow orifice in the main deployment direction.

3. The airbag module as claimed in claim 2, wherein the marginal region of the wall is designed to bear in a sheet-like manner against the marginal region of the inflow orifice.

4. The airbag module as claimed in claim 2, wherein the marginal region of the wall is of sheet-like and annular design.

5. The airbag module as claimed in claim 2, wherein the marginal region of the inflow orifice is fixed on the marginal region of the wall.

6. The airbag module as claimed in claim 2, wherein the marginal region of the inflow orifice of the airbag is secured on the marginal region of the wall by means of a clamping ring.

7. The airbag module as claimed in claim 6, wherein the clamping ring has at least one fastening element protruding in the main deployment direction.

8. The airbag module as claimed in claim 7, wherein the wall is fixed on the base of the generator carrier by means of the fastening element.

9. The airbag module as claimed in claim 7, wherein the gas generator is fixed on the base of the generator carrier by means of the fastening element.

10. The airbag module as claimed in claim 7, wherein in order to fix the airbag on the marginal region of the wall, the fastening element is guided in the main deployment direction through a clearance of the marginal region of the inflow orifice and through a passage hole aligned with said clearance of the wall.

11. The airbag module as claimed in claim 10, wherein the passage hole is aligned with a hole formed in the base.

12. The airbag module as claimed in claim 11, wherein the fastening element is guided through the hole such that a free end section of the fastening element protrudes from the base on a side facing away from the airbag.

13. The airbag module as claimed in claim 12, wherein in order to fix the gas generator on the base of the generator carrier, the free end section of the fastening element is guided in the main deployment direction by a clearance formed on the flange.

14. The airbag module as claimed in claim 1, wherein a second outflow orifice of the airbag is arranged, in an inflated state of the airbag, in the inside space of the airbag module so that gas emerging from the second outflow orifice can pass into the outside space.

15. The airbag module as claimed in claim 14, wherein the second outflow orifice is arranged in the inside space so that gas emerging from the second outflow orifice can pass through the openable region into the outside space.

16. The airbag module as claimed in claim 14, wherein gas emerging from the first and the second outflow orifices is prevented from flowing in a direction oriented opposite to the main deployment direction.

17. The airbag module as claimed in claim 1, wherein for the discharge of gas the airbag has a third outflow orifice that, with the airbag deployed, is arranged in the outside space of the airbag module.

18. The airbag module as claimed in claim 17, wherein in the inflated state of the airbag the third outflow orifice is arranged on a side of the airbag that faces the airbag module.

19. The airbag module as claimed in claim 17, wherein for the discharge of gas the airbag has a further third outflow orifice that, with an airbag deployed, is arranged in the outside space of the airbag module.

20. The airbag module as claimed in claim 19, wherein in the inflated state of the airbag the further third outflow orifice lies opposite the third outflow orifice transversely with respect to the main deployment direction of the airbag.

21. The airbag module as claimed in claim 1, wherein the surface forms a plane.

22. The airbag module as claimed in claim 1, wherein the airbag is fixed on a component of the airbag module via the marginal region of the inflow orifice.

23. The airbag module as claimed in claims 1, wherein the base has a gas generator clearance for receiving the gas generator.

24. The airbag module as claimed in claim 23, wherein the wall runs continuously around the gas generator clearance transversely with respect to the main deployment direction.

25. The airbag module as claimed in claim 1, wherein the wall is designed in the form of a hollow cylinder.

26. The airbag module as claimed in claim 1, wherein a covering for covering the airbag, said covering separating the outside space of the airbag module from the inside space of the airbag module.

27. The airbag module as claimed in claim 26, wherein the airbag can be deployed through an openable region of the covering into the outside space of the airbag module.

28. The airbag module as claimed in claim 27, wherein the first outflow orifice is arranged in the inside space of the airbag module so that gas emerging from the first outflow orifice can pass through the openable region into the outside space.

29. The airbag module as claimed in claim 1, wherein the clearance can be brought out of congruence with the first outflow orifice as a result of a displacement of the movable element in the movement direction, in order to close the first outflow orifice.

30. The airbag module as claimed in claim 1, wherein the movable element is designed as a cylindrical ring running continuously in the movement direction.

31. The airbag module as claimed in claim 30, wherein to displace the ring in the movement direction, the ring has a recess with a margin oriented transversely with respect to the movement direction.

32. The airbag module as claimed in claim 31, wherein the recess is designed as a gap which interrupts the ring and which extends transversely with respect to the movement direction.

33. The airbag module as claimed in claim 31, wherein a further recess in the form of a gap interrupting the ring extends along the margin of the recess.

34. The airbag module as claimed claim 1, wherein the movable element can be moved by means of a movement generation device.

35. The airbag module as claimed in claim 34, wherein the movement generation device has a piston which presses against the margin of the recess in order to displace the ring in the movement direction.

36. The airbag module as claimed in claim 1, wherein the wall is of gas-impermeable design.

37. The airbag module as claimed in claim 1, wherein the wall is formed integrally with the generator carrier.

38. The airbag module as claimed in claim 1, wherein the wall can be fixed releaseably as part of a lower module on the generator carrier.

39. The airbag module as claimed in claim 38, wherein the lower module comprises the movement generation device.

40. The airbag module as claimed in claim 38, wherein the lower module comprises the movable element.

41. The airbag module as claimed in claim 1, wherein the gas generator has a flange for fastening the gas generator to the base of the generator carrier.

42. The airbag module as claimed in claim 41, wherein the flange continuously runs around the gas generator in cross section.

43. The airbag module as claimed in claim 41, wherein the flange is designed for bearing in a sheet-like manner against a continuously running marginal region of the gas generator clearance of the base.

* * * * *